W. W. CONNERS.
METHOD AND APPARATUS FOR DETERMINING THE ACTUAL LOCATION AND ACTUAL MOVEMENT OF BODIES.
APPLICATION FILED JUNE 6, 1919.
1,433,070.
Patented Oct. 24, 1922.
4 SHEETS—SHEET 1.
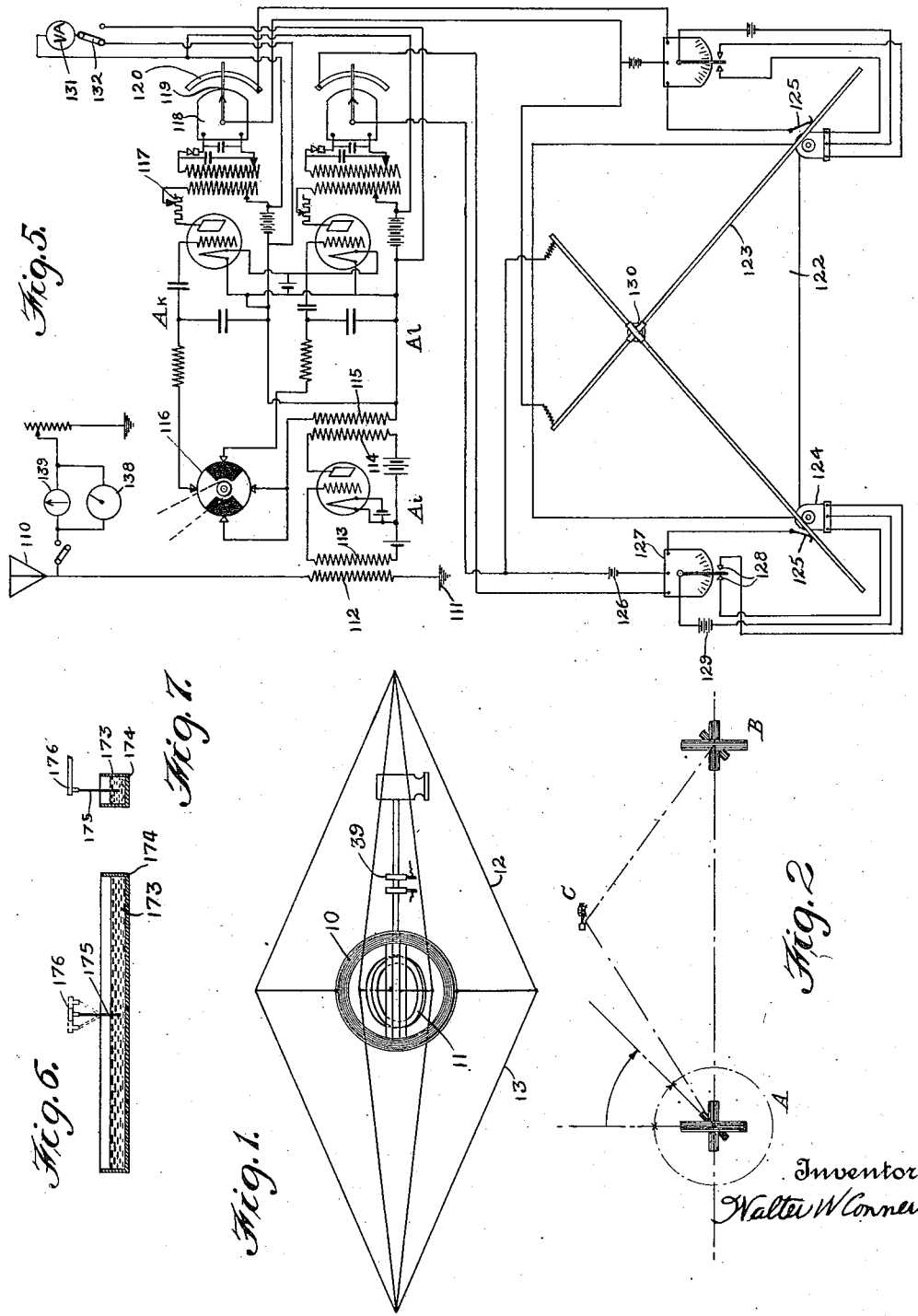

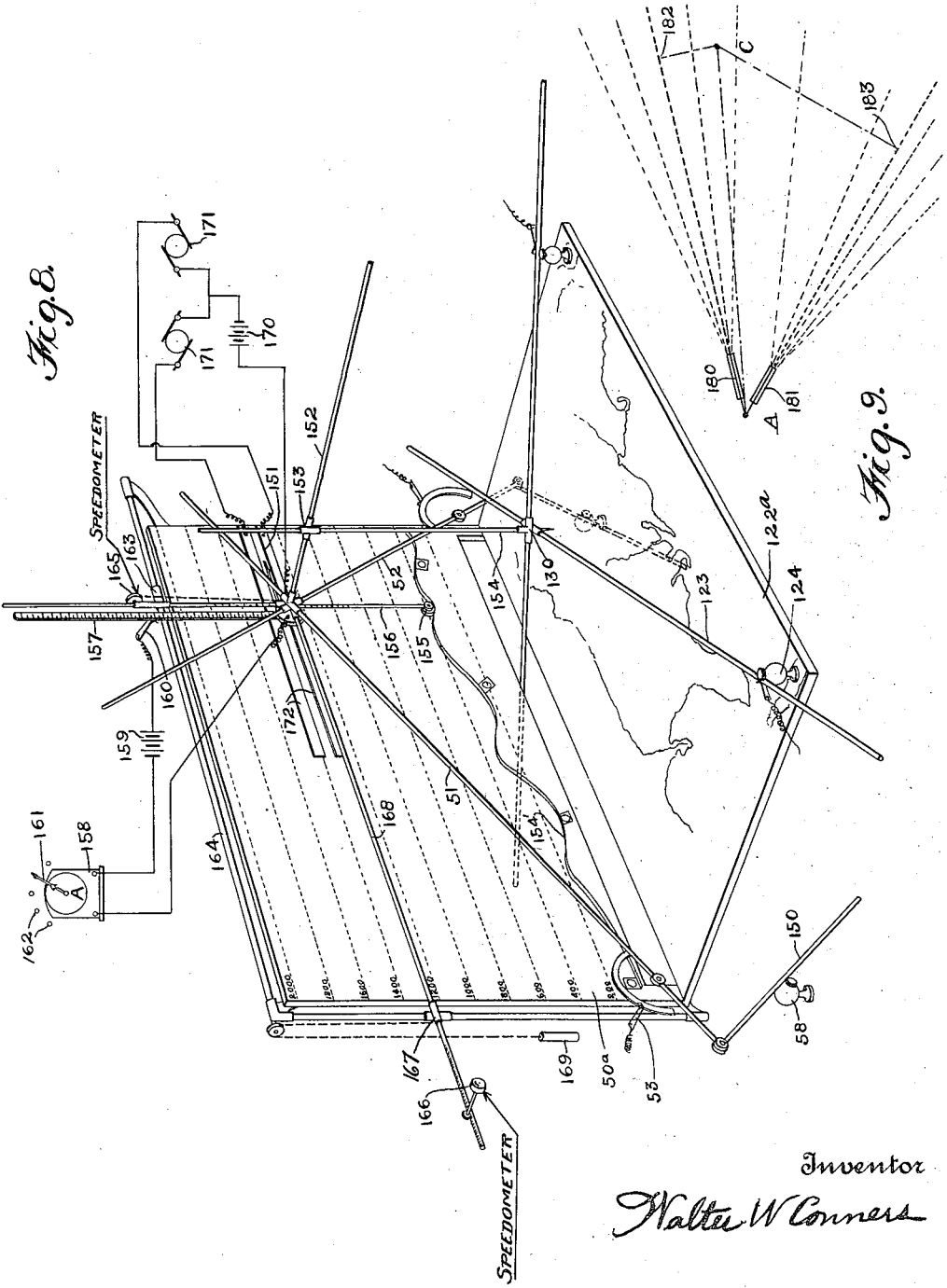

Patented Oct. 24, 1922.

1,433,070

UNITED STATES PATENT OFFICE.

WALTER W. CONNERS, OF ELIZABETH, NEW JERSEY.

METHOD AND APPARATUS FOR DETERMINING THE ACTUAL LOCATION AND ACTUAL MOVEMENT OF BODIES.

Application filed June 6, 1919. Serial No. 302,320.

*To all whom it may concern:*

Be it known that I, WALTER W. CONNERS, a citizen of the United States, residing at Elizabeth, in the county of Union and State of New Jersey, have invented certain new and useful Improvements in Methods and Apparatus for Determining the Actual Location and Actual Movement of Bodies, of which the following is a specification.

This invention relates to a method and apparatus for the transmission of intelligence of certain kinds by the use of radiant energy waves transmitted from one or more than one station and received at one or more than one receiving station, being in its present form a species of radio or electro-magnetic communication.

More particularly the invention deals with a method and apparatus for establishing the position of and controlling the movements of a fixed or movable body by electro-magnetic waves.

While I have, in my co-pending application, filed June 12, 1919, Serial Number 303,753, set forth a certain manner of overcoming the known defects I have also, to the end of overcoming said defects, devised other methods whereof the present invention is one.

To this end there are several important objects to be subserved by this invention, all of which are of substantially equal importance irrespective of the manner and order wherein they are set forth in this specification and accompanying drawings.

One of these objects is to provide an improved method of ascertaining, at a receiving station, the location of one or more transmitting stations in direction, distance, or by a combination of both direction and distance, so that the location of the receiving station may, from time to time, be ascertained.

Another of these objects is to provide an apparatus wherein the location in altitude of a receiving station may be ascertained and may also be represented in similitude or miniature.

A further object of the invention is to provide means whereby the location and movement of a body equipped with a receiving station may be indicated by visual or other intelligible perceptions to a person at said station.

Again, an important object of the invention is to provide a form of the invention wherein the distance of a receiving station from a transmitting station may be made known.

In this connection the last mentioned object is amplified in this invention to embrace, if desired, means to indicate in similitude both the distance from and the angular relation between a plurality of transmitting stations and a receiving station.

Another object of the invention is to enable the position of a receiving station, both geographically and in altitude, to be simultaneously indicated in similitude or miniature.

A still further object of the invention is to provide means for indicating and tracing on a map, chart, profile or the like carried by a moving body the movements of said body in similitude and its location at any instant of time. As a corollary thereto an object of the invention is to provide means controlled by radiant energy from a transmitting station to move, on a map or chart of the zone traversed by a moving receiving station, an indicator over said map in conformity with the movements of the receiving station.

Yet another object of this invention is to provide means whereby radiant energy from transmitting stations may be utilized to afford, at a receiving station, measurements of the ratio of the energy transmitted from respective stations and thereby indicate or record the position of said receiving station.

In apparatus of this class wherein the distances of one station from other transmitting stations is measured in terms of the quantity of energy received at the first station, it is necessary that the energy transmitted by each of said transmitting stations shall be comparable and should be regulated to keep the ratio of energy transmitted by said stations uniform. A ninth important object of the invention is to provide means to regulate the energy transmitted from the transmitting stations automatically.

A tenth object of the invention is to provide means on a body carrying a receiving station for controlling the movements of said body both in altitude and geographically.

An eleventh object of the invention is to provide means for determining and indicating the direction and rate of movement of a body carrying a receiving station on said body.

A twelfth object of the invention is to provide means, at a receiving station on a moving body, for controlling the movements of said body both geographically and with respect to altitude.

A thirteenth object of the invention is to provide means for indicating automatically the position in altitude, of an air ship or the like when traveling over land with respect to the land over which the air ship is at any instant.

A fourteenth object of the invention is to provide means whereby the movements of indicators representing in similitude the movements of an air ship or the like in altitude and in geographical position are correlated to afford mutual checks.

With the above and other objects in view, as will be hereinafter apparent, the invention consists in general of an improved method and certain novel constructions, arrangements of parts and circuits and assembly of details hereinafter fully described, illustrated in the accompanying drawings and specifically claimed.

Attention is called to the fact that throughout the disclosure herein certain instruments and other circuits are shown typically and without amplification or the provision of relays or other means which may be necessary in practice to provide proper or sufficient current. Such means as amplifying or relay circuits or other like appurtenances are well known and are to be understood as present wherever necessary to properly effect the purpose desired.

In the accompanying drawings forming part of this specification, like characters of reference indicate like parts in the several views; and:—

Figure 1 is a diagrammatic view showing the special apparatus for emitting a directive wave as may be used at a sending station.

Fig. 2 is a diagramamtic view of a pair of directive transmitting stations showing in general the use of the apparatus.

Fig. 5 is a wiring diagram showing a modification of the apparatus as used at a receiving station.

Fig. 6 is a detail sectional view showing a form of shifting contact which may be used in connection with certain resistance elements.

Fig. 7 is a view similar to Fig. 6 but at right angles thereto.

Fig. 8 is a perspective view showing a similitude board suitably arranged for use as part of this invention.

Fig. 9 is a diagram showing a modification employing a double radiating antenna.

Figure 3:
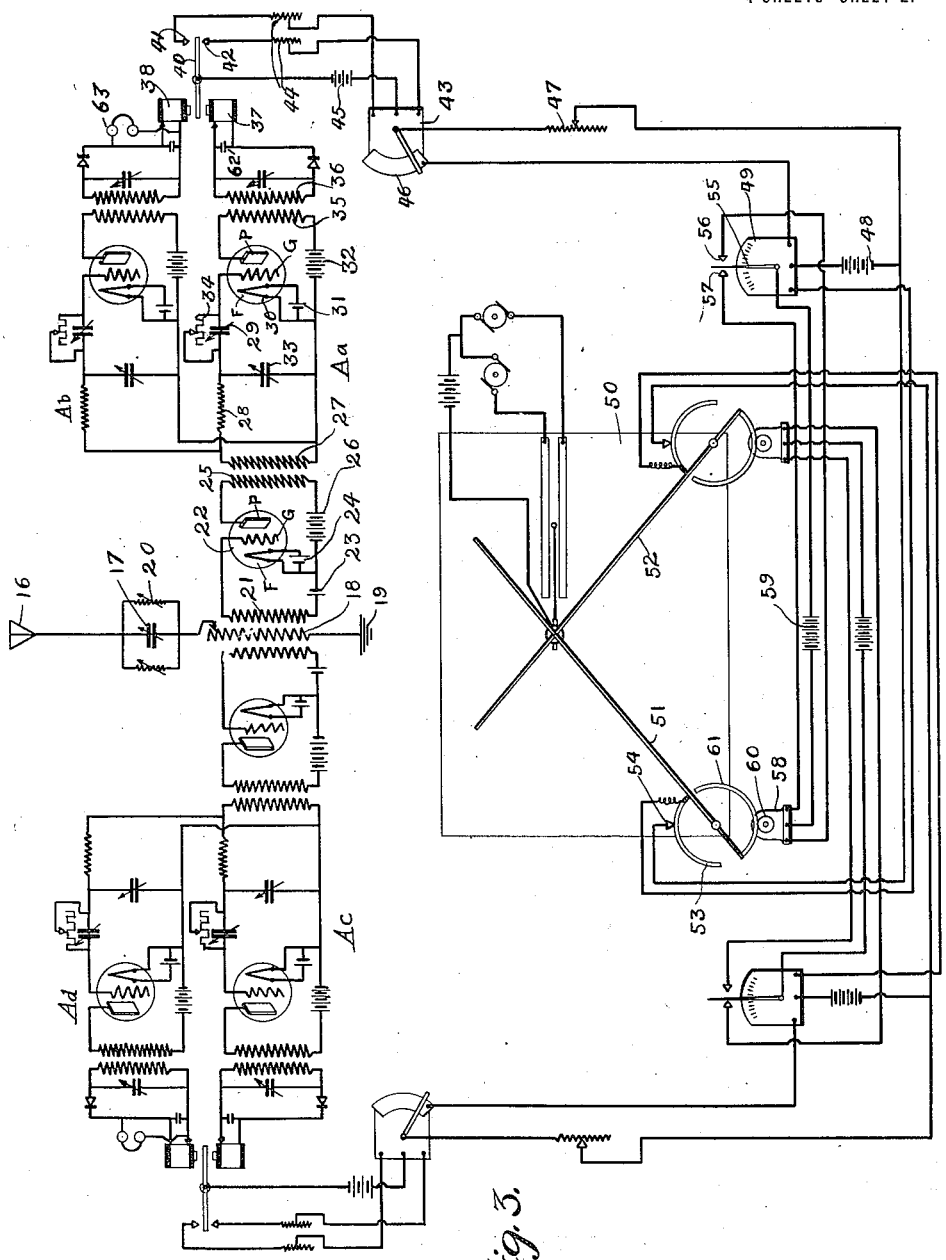
Fig. 3 is a wiring diagram disclosing a form of apparatus suitable for use at a receiving station in connection with this invention.

In the present specification it will be assumed, for the sake of convenience, that the transmitting stations are geographically fixed points, as say A and B, and that the receiving station is located on an air ship such as an aeroplane or dirigible C. It will also be assumed that the control station is at a third fixed point D and that this point is equidistant from the points A and B.

While this assumption is thus made it is to be noted that the transmitting stations may be at geographically movable points such as on board of vessels, and that the control station may also be movable and need not necessarily be equidistant from the transmitting stations since the arrangements may be readily made by the introduction of suitable resistance in certain of the circuits to cause the controlling apparatus to function properly even when the controlling station is not equidistant from stations A and B. This will be fully apparent as the explanation of the apparatus and its operation is developed. Moreover, it will also become apparent that the receiving station may be on a vessel on the water when the apparatus is used merely for obtaining geographic positions, or may be on a land vehicle or at a fixed point, as for instance when making a topographic survey.

In so far as concerns the transmitting apparatus at the transmitting stations A and B which is used to radiate waves to the receiving station C, this apparatus may be of any of the many forms commonly used for such purposes with certain modifications. In other words the transmitting apparatus may contain any of the well known details of keys, spark gaps and the like in addition to the special devices or arrangements required for the purposes of this invention. It is not deemed necessary to describe or show the ordinary apparatus for this purpose, but it is thought necessary only to show and describe those features which are peculiar to this invention or are essentially associated therewith.

One essential feature of this sending apparatus is a means for emitting a directive wave or beam and to accomplish this result the directive wave apparatus illustrated in the patents to Bellini and Tosi, Nos. 943,960 and 948,086 and particularly the arrangement shown in the former patent may be used for the purpose of emitting a wave or beam in planes which are at an angle to the plane of the horizon the apparatus may be of the form therein illustrated, with the axis of the dirigible aerials vertical, but for the purpose of obtaining altitude indications the axis of the dirigible aerials must be horizontal and it is preferred that the device take a form similar to that shown in the present drawings at Fig. 1. In this view it will be noted that there is provided the fixed coils 10 and movable coil 11 arranged as in the Bellini and Tosi patent, and that the dirigible aerials consist of two closed oscillation circuits 12 of triangular shape and two other similar circuits 13, the circuits 12 and 13 being each of triangular shape and arranged with the bases of circuits 12 opposing the bases of circuits 13 in position. With the device in this position and arranged in this manner, if the coil 11 be properly supplied with current and rotated on its horizontal axis a directive wave will be emitted which will follow the movements of the coil 11. As, for instance, if the coil 11 start from a position parallel to the plane of the horizon and be revolved to a zenithal position the directive wave will pass from a position of 0° to the horizontal to 90° to the horizontal. If now an airplane or other receiving station C lie in the path of this wave suitable apparatus may be employed to determine the instant of starting this wave in its arc of movement, the instant it crosses the station C and the instant it arrives at the end of its predetermined arc.

By referring to Fig. 2 it will be seen that the line connecting the two stations A and B is assumed to be a horizontal line and the directive wave or beam is indicated as the line CA. Now, from the foregoing statement it is apparent that the angle CAB can be determined and that, similarly, the angle CBA can also be determined. Since we have the distance between the stations A and B established we have one side and two adjacent angles of a triangle which enables the triangle to be solved and the vertical distance from the point C to the horizontal line obtained.

With these essential facts it is true that the angle may be solved by calculation but under the present invention such calculation, with its attendant factor of human error and time necessary for calculation, is eliminated, all the necessary data being obtained automatically.

In like manner, if the station C be a moving station two triangles may be obtained and solved and thus the rate of movement of the station C from point to point be shown.

In order to obtain the required indications at the receiving station C, apparatus such as is typically shown at Fig. 3 may be employed. In this form of receiving apparatus there is employed an antenna 16 which is connected in series to a variable condenser 17, the primary 18 of a transformer coil and a ground 19. Shunted around the condenser 17 are the variable reactances 20. This forms the open oscillating circuit of the receiving apparatus. At 21 is a secondary in which current is induced by the action of the current passing through the primary 18. This secondary forms part of an amplifier and has one terminal connected to the grid G of an audion or three-element valve 22 provided with the usual filament F and plate P. The remaining terminal of the secondary is connected through a polarizing battery 23 to the negative terminal of the filament F, the positive terminal of said filament being also connected to the negative terminal through the usual filament battery 24. Also the battery 23 is in the line connecting the coil 21 with one terminal of the primary 25 through the line battery 26. At 27 is a transformer secondary wherein current is induced by the current flowing through the primary 25. One terminal of this secondary 27 is connected through inductance 28 to a condenser 29 which is in turn connected to the grid G of an audion 30 which is provided with the usual filament F and plate P. In this circuit there are also provided the usual filament battery 31 and main battery 32 connected in the usual and well known manner. Also the circuit is provided with a variable condenser 33 shunted across the connections from the terminals of the secondary 27 and a variable resistance 34 is shunted around the condenser 29. The plate P of this audion is connected to one terminal of an inductance primary 35, the other terminal being connected to the battery 32 as usual.

At 36 is an inductance secondary energized from the primary 35 and this secondary has one terminal connected to a magnet 37, the other terminal being also, but variably connected to said magnet. Thus the number of ampere turns about the magnet 37 may be controlled. A condenser 62 is shunted across the terminals of magnet 37 in order to properly energize the magnet. Moreover if the current obtained in the secondary 36 is not sufficient to operate the magnet effectively, additional amplifying means or relays may be added as can be readily understood, or the secondary 36 may be used, as illustrated and described in my co-pending application, filed June 12, 1919, and bearing the Serial Number 303,753, to cause operation of a coherer controlled local circuit.

For the purpose of convenience in describing the operation of the device, the amplifying circuit just described and including all the elements between the secondary 27 and magnet 37 will be referred to as the amplifying circuit A$^a$.

Also connected in parallel to the secondary 27 is a second amplifying circuit A$^b$ exactly similar in all respects to the circuit A$^a$ and like it operating a variable magnet as indicated at 38.

It will be plain that the circuits A$^a$ and A$^b$ can be tuned to receive waves of different types or lengths so that if a wave of one predetermined length is received the magnet 37 will be energized while, if a wave of a second predetermined length is received, the magnet 38 will be energized, the respective circuits being tuned for the proper reception of said wave lengths.

It is also to be understood that the antenna circuit and first audion or valve circuit are loosely tuned so as to receive certain wave lengths, the selective effect being accomplished by the circuits A$^a$ and A$^b$.

It is the intent that the sending station which controls the two magnets 37 and 38 shall transmit waves of two different characteristics, say of 1200 and 1800 meters length respectively. It is also intended that one of said waves shall be a uniformly radiating wave and shall be emitted at the time the other wave, which is a directive wave or beam, passes a predetermined point in its rotation. This point may be taken when the directive wave is in its horizontal or its vertical position or any other position desired. Moreover there will be a gap or hiatus in the directive wave for part of its revolution (say one half), which may be obtained by suitably designing the commutator rings 39 of Fig. 1 to allow the brushes to engage the conductive part of the rings only for the period in which the wave is desired, the rings being partly of conductive and partly of insulating material for this purpose. This gap will thus prevent interference of the two waves and will also prevent the magnet controlled by the directive wave from being influenced twice during each revolution of the directive wave.

For example, let it be assumed that the uniformly radiating wave is of 1200 meters length and the directive wave of 1800 meters. Also suppose the uniformly radiating wave be emitted as the directive wave starts to sweep through the arc extending from its vertical to its horizontal position. The circuit A$^a$ being tuned to 1200 meters and the circuit A$^b$ to 1800 meters then at the time of emission of the uniformly radiating wave the magnet 37 will be momentarily energized. Also, as the directive wave moves across the receiving station the magnet 38 will be momentarily energized.

Next to be considered will be the means by which the actions of these two waves, in energizing the respective magnets, are utilized to obtain information regarding the position of the receiving station C.

Between the two magnets is an armature 40 oscillating between contacts 41 and 42 connected to respective sides of a ratio galvanometer or the like 43 through variable resistances 44. By "ratio galvanometer," as used in this connection, is meant an instrument of special character designed to indicate the ratio of the current flowing from the battery 45 during the times when circuit is closed between the armature 49 and the respective contacts 41 and 42. Thus this instrument will indicate the ratios between the times when the respective magnets 38 and 37 are energized. Connected to the armature in series are the battery 45 and middle terminal or binding post of the galvanometer 43. The galvanometer arm is extended to engage a variable resistance bar or trough 46 and is connected though a variable resistance 47 and battery 48 to a galvanometer 49. In like manner the trough or bar is connected to one side of the galvanometer. At 50 is a similitude box having arms 51 and 52 pivoted to places representing stations A and B. Carried by the arm 51 is an arcuate resistance bar 53 which is connected to the galvanometer 49. Engaging this arcuate bar 53 is a contact and brake 54 connected to the galvanometer 49 through the battery 48. By this means a form of Wheatstone bridge is formed which, by proper adjustment of the resistances 47, 46 and 53, may be balanced.

It will be seen from the description of circuits A$^a$ and A$^b$ that these circuits cause the arm of the galvanometer 43 to vary in position in a certain definite ratio with the angular relation between the horizontal and a line passing through the transmitting and receiving stations. Consequently the resistance in the bar 46 will also vary as the angle above mentioned varies, this being determined by the ratio between the times of energization of the magnets 38 and 39.

The galvanometer is provided with an extended hand or pointer 55 which oscillates between contacts 56 and 57 connected to respective sides of a reversible motor 58, the hand being connected to the motor through the battery 59. By means of a gear 60 and arcuate rack 61 the motor will cause the resistance 53 to be moved back or forward under the contact 54. If the sides of the Wheatstone bridge be properly adjusted any variation in the resistance of the bar 53 from that proper to resistance 46 will cause movement of the hand or pointer 55 to engage one of the contacts 56 or 57 and this in turn will actuate the motor 58 to rotate the arm 51 in the proper direction until balance is restored, whereupon the arm or pointer 55 will move to neutral position and there remain until the balance is again disturbed. Since the hand of the galvanometer 43 moves over its bar 46 proportionately to the angle traversed by the directive wave from vertical to alinement with the receiving station, the angle between the vertical position of the arm 51 and its final position when the motor 58 ceases, for the time, to operate will be equal to the angle traversed by the directive wave and the arm 51 will thus indicate the direction of the straight line passing through stations A and C.

It will be noted that wherever the term "directive wave" is used, in relation to its angular position or its movement, the center or line of greatest intensity of said wave is referred to, in other words, the plane or line passing through the middle of the wave is what is referred to. Moreover, allowance is always made for any deflection of this wave or beam caused by any outside means as it sweeps over its predetermined arc. Again, in the example just concluded it is assumed that no interference takes place in the directive wave or beam. It is, however, to be understood that such interference may take place, due to deflection or distortion of the directive wave by earth currents, lag or other extraneous electric or magnetic causes and the effects of such causes with their attendant inaccuracies and errors must be overcome by properly adjusting the receiving instruments or the sending instruments, according to the cause and the errors or other effects produced.

At the receiving station there may also be a duplicate of the apparatus just described including loosely tuned antenna and first audion circuits as well as amplifying circuits A$^c$ and A$^d$ tuned to receive waves from station B, say of 3000 and 4000 meters wave length and controlling the arm 52 just as the circuits A$^a$ and A$^b$ control the arm 51. Thus the intersection of the two arms will in similitude, give the position of the receiving station and, by suitable indications on the similitude board 50 such as altitude levels, the height of said station C above a desired datum line such as sea level or the surface of the earth, or the like.

It will also be obvious that the directive waves may be caused, as in my co-pending application, above noted, to revolve about vertical axes and the geographical position of the receiving station obtained.

It will be noted that the condenser 62 is bridged across the terminals of the magnets thus permitting, in the circuit tuned for the uniformly radiating wave, a telephone 63 to be included so as to enable the signals emitted at the starting of the operating cycle (the entry of the directive wave into the predetermined arc of position determining movement) to be determined audibly and thus afford a check on the operation of the instruments at the receiving station.

In the form of apparatus which has just been described the position of the receiving station is determined through the action of one or more directive waves or beams. We will now consider a form wherein the relative intensities or quantities of electric energy or a combination of both received at the receiving station are utilized to determine the position (either geographical or altitudinal or both) of the receiving station.

Figure 4:
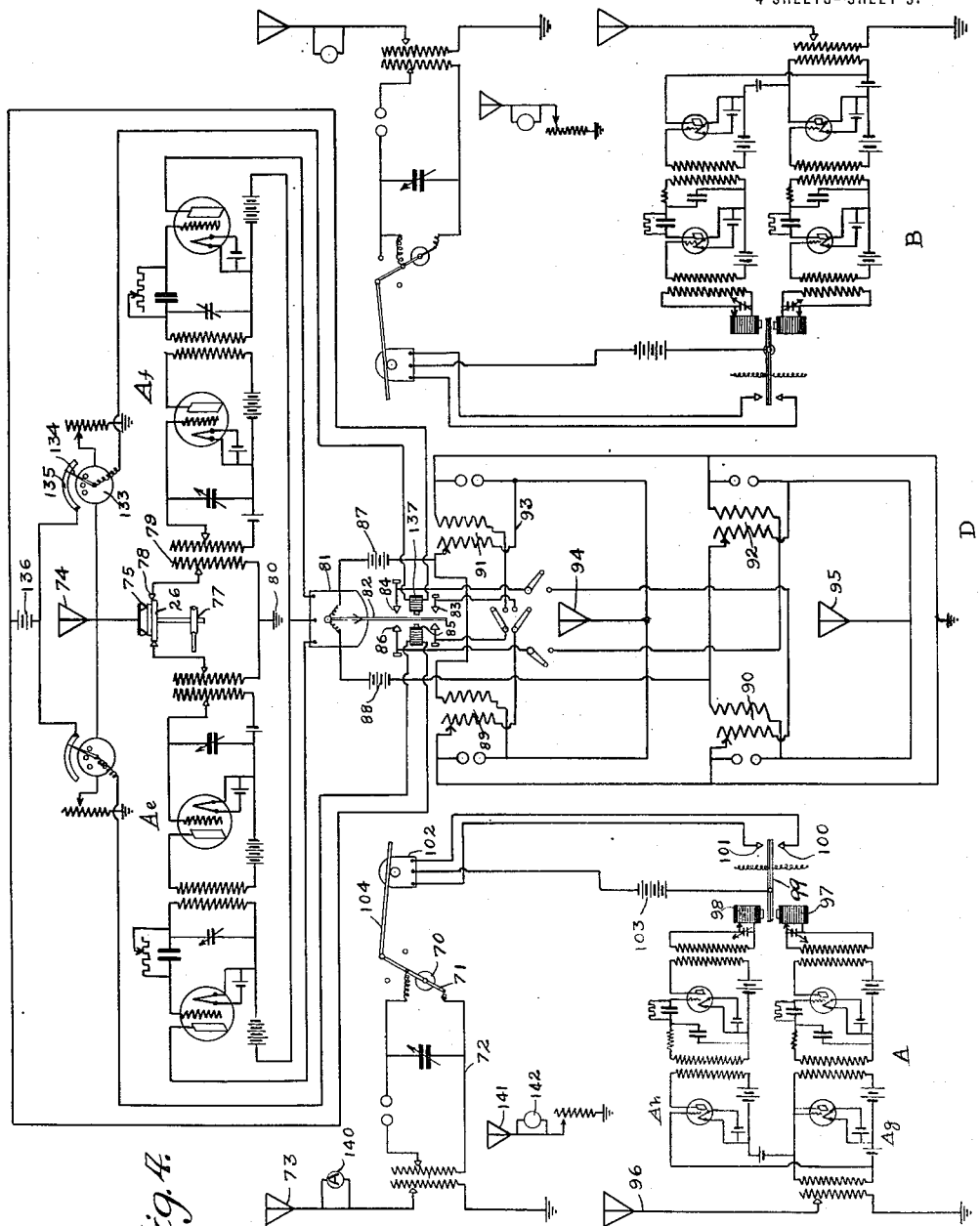
Fig. 4 is a wiring diagram showing the arrangement of the crcuits at two transmitting stations and a control station.

Considering first the operation of a system wherein intensity alone is employed it becomes obvious that, in order to determine the relative distances of a point (the receiving station) from two other points (the sending stations) it is necessary to know the relative intensities of the waves emitted by the two governing points or transmitting stations and the related intensities at one or more points between them. Further, to do this in a simple manner it is necessary that the effective intensities emitted should be equal in order to eliminate the ratio factor between the two emitted intensities. To effect this the apparatus disclosed in Fig. 4 has been invented and in this figure there is disclosed the apparatus at the two stations A and B as well as that at the controlling station D. Each of the sending stations is provided with a source of current such as a high frequency generator 70 connected to a transmitting circuit 72 here indicated as of the elementary form although this circuit will naturally be of more improved arrangement, the present indication being merely typical of any such circuit. The generator 70 is of the type having a direct current exciter on the same shaft so that by shifting the brushes of the exciter the rate of emission of the emitted waves can be regulated by the adjustment of such brushes 71. The circuit is supplied with the usual antenna 73. Thus by properly adjusting these brushes at each station the rate energy is radiated from the respective antennæ can be regulated. It is obvious that this regulation of energy may be controlled by suitable measuring instruments at the stations A and B, but such equality will not be the effective equality at a point intermediate the two stations owing to the extraneous effects of earth currents, static, the atmospheric condition, and other interference.

For the purpose of controlling the energy output of stations A and B one or more intermediate controlling or measuring stations are provided, one controlling and measuring station being indicated at D.

At the station D, which for the moment is assumed to be equidistant from the stations A and B, there is provided a receiving antenna 74 which is connected to a contact 75. At 76 is a commutator arranged to be engaged by the contact 75 and to be constantly revolved by some suitable apparatus here typified by the shaft, pulley and belt 77. Engaging the commutator are the contacts 78, the commutator being one half of conducting and the other half of insulating material, and these contacts 78 are arranged diametrically opposite each other on the commutator. These contacts are variably connected to the primaries 79 of the usual inductances, the primaries being suitably grounded at 80. Thus there is formed a pair of open oscillating circuits which operate alternately so that the waves emanating from stations A and B are alternately received for equal or comparable time intervals, the transmitting circuits at these stations and the receiving circuits being suitably tuned to effect distinction between such waves. The secondary of each inductance, whereof 79 is the primary, forms part of an amplifying circuit such as has been previously described in connection with the directive wave apparatus so that it is not here necessary to repeat the details of such circuit. These two circuits are therefore indicated in general as $A^e$ and $A^f$ and are connected to the two sides of a ratio galvanometer 81 of suitable form and construction. This meter is provided with an extended hand 82 arranged to engage the adjustable contacts 83 and 84 for controlling station A and the adjustable contacts 85 and 86 for controlling station B. Batteries 87 and 88 each have a terminal connected to the hand 82. Connected to the contacts 83, 84, 85, and 86 respectively are the induction coils 89, 90, 91 and 92, forming parts of transmitting circuits here only indicated typically as at 93. The induction coils 89 and 91 are connected to the transmitting aerial 94 while the coils 90 and 92 are connected to the aerial 95.

While the three aerials or antennae 74, 94, and 95 are here shown as separate, it is to be understood that it is not essential or even, in most cases, desirable that separate antennae should be employed, a single antenna being sufficient, the showing here being employed for the sake of illustrating the operation more clearly and without confusion of the circuits.

At each of the stations A and B there is provided a receiving aerial or antenna 96 and this, like the antennae at the station D, may be identical with the antenna 73, being, as in the former instance, shown separately to prevent confusion. Each station A and B has this receiving antenna inductively connected to selective multiplex amplifying circuits $A^g$ and $A^h$, including the magnets 97 and 98 controlling the armature lever 99 vibrating between the contacts 100 and 101. The armature lever is connected to the central terminal of a reversible motor 102 through the battery 103, while the contacts are connected to the side terminals of said motor. A suitable rack and gear 104 affords operative connection with the brushes 71 of the motor 70 so that, as the motor runs in one direction or the other, the brushes are likewise adjusted.

To understand the operation let it be supposed that the station A is emitting a greater amount of energy than station B. Then the antenna 74 will receive such waves and through the amplifying circuits $A^e$ and $A^f$ the meter 81 will cause the hand 82 to move towards the left and engage the contacts 85 and 86 and thus close circuits through the induction coils 91 and 92, causing waves to be emanated from the antennae 94 and 95. The coils and the amplifying circuits $A^g$ and $A^h$ are so tuned that each coil causes the production of waves of a certain distinctive length at the respective transmitting stations. This in turn causes closure of the circuits through the motors 102 so that the brushes 71 are moved thereby to decrease the quantity of energy emitted from station A and increase the quantity of energy emitted from station B. This action continues until the waves received by the antenna 74 are equal in energy, whereupon the hand 82 resumes its central position and action of the motors ceases, to be resumed only when the energy received from the stations A and B at D are again unbalanced. Of course unbalance in the opposite manner causes opposite movement of the brushes and opposite results. Thus the energy in the waves emitted by statinos A and B will be constantly kept at such intensities, irrespective of the variance in local conditions between stations A and D and between stations B and D, that they will be effectively equal at D.

We will now consider the apparatus used at the receiving station C to detect and utilize the waves of equal effective intensities emanating from stations A and B. This apparatus is disclosed in Fig. 5 wherein is shown an antenna 110, preferably of the uniform receiving type, connected to a suitable ground 111 through the primary 112 of an inductance, the secondary 113 whereof forms part of the first step in an amplifying circuit $A^i$ loosely tuned to receive all waves from stations A and B, including the primary 114 of a second inductance. The secondary 115 of this inductance forms part of two amplifying circuits $A^k$ and $A^l$ which are in general of the type of the circuits previously described but differ therefrom in that the audion grids are connected to the secondary 115 through a constantly revolving commutator 116 so that for one half the time of operation the circuit $A^k$ is affected, the circuit $A^1$ being affected during the remainder of the time. Moreover the plates of the audions have variable non-inductive resistances 117 interposed in their circuits. Each of the amplifying circuits thus formed controls the action of a ratio galvanometer or the like 118, provided with a hand 119 traversing a resistance 120 or the like.

It is, of course, to be understood that the distances from the respective transmitting stations A and B control the position of the hand 119 and consequently the effective length of the resistance bar 120. This is occasioned by reason of the fact that the amount of energy received by the antenna 110 varies roughly with the square of the distance from the transmitting station. In consequence a variation of position in station C with respect to stations A and B will cause variation of the balance of the Wheatstone bridges which will only be equalized when the arms 123 are moved to restore the balance, such movement being the equivalent in similitude to the movement of the station C.

It is well known that the energy required to transmit electro-magnetic waves varies from time to time (as from day to day) in accordance with varying conditions. It is necessary, therefore, to vary the resistance of the resistance bar so that the energy received by station C at a definite point is equal independently of varying conditions. This change of resistance is best accomplished by providing several bars and introducing the proper one for the conditions as observed by suitable means.

Each resistance forms the resistance member in one arm of a Wheatstone bridge having a ratio galvanometer like the galvanometer 43 and, though not shown, which may be similarly arranged as in the first case or there may be provided a similitude board 122 having arms 123 which are pivotally and slidably arranged on the board, the sliding movement being controlled by motors 124. These arms slide under contacts and brake 125 and are connected to the galvanometer through the battery 126 so that the arms 123 form the resistance elements of the balancing arms of the Wheatstone bridge. Thus when the bridge is thrown out of balance by the movement of the hand 119 of the respective circuit, the hand of the bridge galvanometer 127 will engage one or the other of the contacts 128 and close a circuit through the battery 129 and motor 124, just as in the previous case. The motor will thus continue to operate until balance has been restored by the lengthening or shortening of the effective resistance length of the respective arm 123 when the galvanometer hand will assume the zero position and break the motor circuit. Since the points relatively representing stations A and B on the similitude board are fixed and the arms 123 pivotally connected by a slider 130 there will thus be obtained a triangle whereof the three sides are known and the apex of this triangle will, in similitude, represent the location of station C.

It has been assumed that the station D is located midway between or equidistant from stations A and B. This is not essential. Station D may be at any desired point as it is merely necessary to introduce resistance on the side of the nearer station to the proper amount to theoretically produce balance between the effective action of the waves received from stations A and B at station D. This effect may also be obtained by proper adjustment of the meter 81 so that the normal position of the hand will be intermediate the contacts.

A point to be observed in connection with stations C and D is that either the relative internal resistances of said stations should be equal or the operator at station C should know the ratio of the internal resistances of stations A and B and station D. Also it is to be understood that all necessary allowances be made in adjustments for the irregularities or discrepancies due to the differences in action or resistance of the various elements of the apparatus such as the antennae, amplifiers and other parts. In some instances such variations may be overcome by properly arranging connections as, for instance, by connecting the two filaments of the audions in Fig. 5 to a common filament battery. In other instances provision may be made for detecting variations due to the individual equation in certain instruments. For instance, in Fig. 5, it will be seen that the connections to the meters 118 may be connected to a double reading volt ammeter 131, a switch 132 being employed so as to enable either meter 118 to be compared with the meter 131 thus ensuring detection of any discrepancies in the action of the meters 118.

Attention is called to the fact that, while the motors 102 are shown as controlling brushes on A. C. generators in Fig. 4, it can be readily understood that various other means (as for instance solenoids) may be employed to regulate the current in circuits 72 so that the means shown is only to be taken as typical of some suitable means for the purpose.

Also the condenser and spark gap can likewise be regulated in the same manner as the brushes are regulated, thereby controlling the intensity and potential of the radiated waves.

In the apparatus just described there exists certain difficulties in use, since there is constant change in the transmittive action of the region between any two points due to changes in static, earth currents, atmospheric conditions, etc. These changes are essentially in the nature of fluctuations rather than permanent changes or changes lasting a considerable time except the differences between day and night. Thus the total quantity of current received by station C from a station such as A is for a time period of reasonable length (say thirty seconds), the same for practical purposes as the current received in the next or any other like period, while station C maintains its relative position with respect to station A. To this end it is necessary that means should be provided at station D for controlling the total quantities of electricity emitted by stations A and B.

To check the accuracy of the above apparatus and to effect such control there is provided at station D recording wattmeters 133 of proper size and calibration to indicate the total power received at station D from each of said stations A and B. These meters are preferably of the integrating type or other types measuring in terms of "work times time" and the hot wire type of wattmeters is also preferably employed in all instances where totalizing meters are needed. Furthermore in all instances of the employment of meters amplifying circuits may be used for the sake of greater accuracy since if a meter is correct to one unit the greater the number of units measured the less will be the percentage variation from truth. Again, it is desirable to use amplifying circuits to eliminate unwanted waves or interference thus measuring only the effect produced by the proper waves. It is therefore to be understood that the meters 133 may be in amplifying circuits, although these circuits are not shown in the drawing for the sake of simplicity. The circuits, wherein the wattmeters 133 are interposed, are tuned to receive the waves from the respective stations and the hand 134 of each meter rotates over a contact bar 135 which is connected to a battery 136 while the hand 134 itself has connection with a magnet also in circuit with the battery. These magnets are arranged on opposite sides of the hand 82 so as to attract the same in one direction or the other and thus whichever magnet exercises the greater force (due to the greater quantity of current) will attract the hand 82, assisting and checking the action of the meter 81. This in turn affects the action of the generators at stations A and B as previously described so that the combined factors of quantity of current emitted and its intensity remain substantially constant for each selected time period.

Moreover, the station C (Fig. 5) is provided with a voltmeter 138 and ammeter 139 which can be observed by the operator from time to time to obtain a check on the action of said station. These meters may, of course, be on amplifying circuits.

For the purpose of permitting the observers at the sending stations to have a knowledge of the power emitted, a watt meter 140 may be connected to the transmitting antenna and a receiving antenna 141 having connection with a similar ammeter or wattmeter 142 may be employed at each station to record the amount of energy in the air.

Thus far it has been assumed that each sending station would have to emit a distinctive uniformly radiating wave so that the waves from one station would affect one portion of the receiving apparatus, the waves from the other station affecting a second portion of such receiving apparatus. This is not, however, necessary as the sending stations may, if desired, emit waves of the same character, the receiving stations being provided with directive antennae so that the waves from the sending stations are received alternately. Such an arrangement would be particularly adaptable to navigation off a coast where the two sending and the receiving stations would not come into alinement.

With the complete apparatus for determining the position of the receiving station by intensity and quantity it will be seen that the middle or regulating station D has the function of holding the waves radiating from distant stations A and B to a common standard or at least to a comparable standard, the total energy recording wattmeters at D regulating the total amount of energy transmitted by each of stations A and B in each predetermined time interval so that the amounts transmitted are equal or in a fixed ratio so as to be comparable.

As above said, throughout the apparatus which has been described, it is to be noted that certain resistance bars are used such as the elements 46, 53, 120 and 123, and it is to be observed that these bars can be changed to suit varying conditions of intensity and quantity of current, such changes being made in accordance with the requirements either as indicated by suitable instruments at the station in which the bars are to be changed or as signalled from some other station. Care should be taken in determining the proper resistance bars to use the quantity of electricity per unit of time at both the transmitting and middle stations so that fluctuations of the waves will not mislead into the use of the wrong bar. In this connection the wattmeters in the transmitting stations, which give the total watts are of great value.

While it has been heretofore assumed that the operation of the sending stations, and consequently of the receiving stations, is continuous, it is not necessary that this be so. On the contrary it is plain that the operation may be discontinuous, the sending or transmitting stations operating for certain definite time periods interrupted by other definite time intervals. Of course it will be necessary with such an arrangement that the wave periods synchronize at all stations and be equal in length and also the intervals should be equal in length.

Caution must be observed in connection with the use of intensity or quantity methods, since the angularity of the lines passing through the sending and receiving stations varies with the altitude of the latter and consequently the distance may vary between the receiving station and the sending stations irrespective of the geographical position of said receiving station.

Attention is also called to the fact that the transmitting stations may readily be arranged to transmit automatic signals to indicate the total amperage or how much the transmitting station is radiating per unit of time.

While the two methods above described (method of directive waves and the method by intensities or quantities) have been indicated as used separately yet a combination of the two is of great use in many instances. It is to be remembered that the directive wave method acts on the principle of the solution of a triangle when one side and its adjacent angles are known, while the other method depends on the three sides of a triangle being known or determined. This is true because the intensities vary inversely as the distance the receiving station is from the fixed stations and since we have a fixed distance between the fixed or sending stations and a determinable ratio between the other two sides of the triangle, that is to say between the distances from respective sending stations, we practically determine the three sides of the triangle. The combination of the two methods can be obtained by using two sending stations and a receiving station, the position (and consequently the distance from each sending station) being obtained by the action of the intensity or amount of electricity and one directive wave or beam being used to obtain the angle. Thus we have two sides and the included angle to afford the solution of the triangle and consequently can determine the altitude.

In connection with this apparatus it is preferred to use a special form of similitude board which is a combination of boards for both altitude and geographical positions, such boards being clearly shown in Fig. 8. In this figure the horizontal board or map board is shown as operated by the intensity or quantity method and corresponds to the board 122 of Fig. 5 and being indicated at 122ª, the other board using the directive wave method and corresponding to the board 50 of Fig. 3 and being indicated at 50ª. A slight modification is shown in the manner of moving the hands or pointers 52 in this form, a straight rack 150 replaces the segment 61 of Fig. 3, the effect being the same. The arms 51 and 52 are provided, like the arms 123, with a pivoted slider 151 common to both arms so that the position of the slider 151 indicates the position in altitude of the station C while the position of the slider 130 indicates the geographical position of said station. Moreover, each slider will be the same distance, laterally, from the respective stations so that one slider will act as a check on the other. Since the two sliders move laterally in unison, it is possible to connect them by suitable means to enable the altitude to be read with respect to any geographical position of station C. To effect this, the slider 151 carries a horizontal arm 152 extending over the board 122ª and provided with a slider 153 wherethrough extends a vertical scale bar 154, having proper altitude divisions marked thereon, the slider 153 being provided with a suitable index or datum line to enable proper readings to be made. Thus the altitude at any particular geographical position can be directly read.

Frequently it is desirable and at times essential that the distance of an airplane above the ground be known as, for instance, in crossing a mountain range between two points as in the case of a mail route or the like, and for landing when ground or surroundings are not visible. For this purpose a detachable contour strip 154' may be provided, the upper edge forming a cam surface over which moves a roller 155 carried on the bottom of a scale bar 156 which passes slidably through the slider 151, the latter being provided with a suitable index and the scale bar being provided with divisions giving the height. Thus, as the slider moves across the similitude board 50ª, the roller 155 travels along the edge of the contour strip and the bar 156 rises and falls in accordance with the elevation of the ground, the position of the slider being, in similitude, that of the airplane above the datum such as the sea level.

Again, a scale bar 157 may be attached to the slider 151 and have an inverted scale thereon, some suitable line as the top of the board being used for the index. This scale bar may also have the lower end connected to an ammeter 158, the ammeter being connected through a battery 159 to a contact 160 wherewith the bar 157 has sliding engagement. The ammeter itself has an extended hand 161 traversing a series of contacts 162 so that circuits may be closed to send signals indicating the height of the airplane to a distant station, or other uses.

This bar 157 may also pass through a slider 163 carried on a bar 164 at the upper edge of the board 50ª, the slider carrying a speedometer 165 or other like device actuated by the rising and falling movements of the slider 151 and being properly scaled and geared to indicate the rate of rise and fall of the airplane. Moreover, the speedometer may, if desired, have its hand arranged to engage one or more contacts and close circuits either for the purpose of giving alarm signals when excess rate of vertical movement is approached, when making sudden adjustments to prevent such excess and for other like purpose.

Similarly a speedometer 166 may also be carried by a slider 167 moved vertically as the airplane rises or falls by a rod 168 fixed to the slider 151, a suitable counterbalance 169 being provided.

Also the slider 151 may be connected through a battery 170 to motors 171 arranged to run in opposite directions and connected to control bars 172 between which the slider 151 moves. These motors may be connected to the vertical steering gear of the airplane so that the airplane may be caused to travel between certain predetermined altitudes since any movement above or below such altitudes will result in a circuit being completed which may be used for any purpose such as moving the vertical rudder to cause movement of the airplane away from the limiting altitude.

Of course the lateral speedometer could be provided with the usual totalizing or integrating arrangement to indicate the total distance traveled and similar speedometers could be arranged in connection with the slider 130 without difficulty so that actual traveled distance could be recorded.

In addition a suitable pencil could be employed either in connection with the slide 151 or on a projecting position of the bar 168, the pencil tracing the vertical movements of the airplane on the board 50ª in the first instance or on a supplementary board or chart in similitude or miniature in the last instance.

Under the action of this apparatus it would be possible, also, to control the operation of the airplane from the sending stations by deliberately altering adjustments so as to cause false action of the receiving apparatus. For instance altitude indications could be sent out that would cause the position taken by the slider 151 to simulate a higher position for the airplane than its true altitude. This, if the contact bars 172 were in service, could cause downward movement of the airplane, since contact would be made with the upper bar by the slider and the airplane rudder moved to deflect the plane downwardly. Also this could be accomplished by varying the rate of energy radiated without correspondingly changing the resistance bars thus altering the course of a ship or the like even though the course has been predeterminedly set on such ship. That this may be done will be understood when it is considered that an increase in the rate of energy radiation at a station without changing the resistance bar to agree therewith has the effect of causing more energy to be received at the ship station C so that it is apparently nearer to the station increasing its rate of energy transmission than the true distance. In like manner a decrease in energy radiation makes the ship station appear further from the radiating station so that, in each instance, the automatic controlling apparatus at the ship receiving station is brought into play.

Figs. 6 and 7 show a form of resistance that is peculiarly adapted to this apparatus wherein small vibrations or fluctuations should be eliminated. To this end the resistance takes the form of a conducting liquid 173 held in a non-conducting trough 174, a filamentous contact 175 dipping into the resistance from the instrument hand 176. Thus the viscosity of the resistance fluid dampens the movement of the contact 175 and prevents it vibrating with the hand 176.

A further modification of the invention is shown at Fig. 9. In this modification but one transmitting station is necessary, this station, as A, being provided with two sets of antennae 180 and 181, divergently arranged. It is well known that an antenna of the character shown propagates waves which are strongest in line with the antenna and gradually weaken on either side, such waves being diagrammatically indicated by the dotted lines whereof lines 182 and 183 are the respective center lines along which the waves are strongest. Thus with a receiving station at C equipped to measure the intensity or quantity ratios of the waves emanating from the respective antennae the ratios of the lines C—182 and C—183 can be determined. Such apparatus is well known and need not here be described. The station C is also equipped with the necessary apparatus for determining the distance A—C so that with these factors known the position C is determined.

Having thus described the invention, what is claimed as new is:—

1. That method of ascertaining the position of a receiving station with respect to a plurality of transmitting stations emitting radiant energy which consists in measuring the ratio of the energies received from said transmitting stations, indicating said ratios in similitude on a suitably prepared surface and thereby determining said position.

2. That method of ascertaining the position of the receiving station with respect to a plurality of transmitting stations emitting radiant energy which consists in measuring the ratios of the energy received from said transmitting stations, indicating angularly disposed lines having said ratios on a map or chart showing in similitude the transmitting stations and the field of travel of the receiving station, said indicating lines terminating at the representations of the transmitting station points.

3. That method of ascertaining the position of a receiving station with respect to a plurality of transmitting stations emitting radiant energy which consists in measuring the ratio of the energies received from said transmitting stations, determining the angular relation of a line passing through said receiving station and a transmitting station and a datum line passing through said transmitting station, indicating lines having said ratios and angular relation in similitude on a proper chart or map and thereby determining said position.

4. In a system of the class described, a plurality of transmitting stations arranged to propagate waves of radiant energy and provided each with means to regulate the energy propagated, a controlling station having means to receive said waves, means at the controlling station actuated by the differences in the energies received from the transmitting stations and arranged to effect propagation of controlling waves, and means at the transmitting stations to receive the controlling waves and thereby operate the energy regulating means.

5. In a system of the class described, a plurality of transmitting stations arranged to propagate waves of radiant energy and provided each with means to regulate the energy propagated, a controlling station having means to receive said waves and including an instrument to detect lack of balance in the energy received from respective transmitting stations, transmitting circuits at the controlling station arranged to cause propagation of controlling waves from said controlling station, circuit closing means for said circuits controlled by the instrument, and means at the transmitting stations to receive the controlling waves and thereby operate the energy controlling means.

6. In a system of the class described, a plurality of transmitting stations each arranged to propagate waves of radiant energy and provided each with means to regulate the energy propagated, a controlling station having means to receive said waves and including an instrument to detect fluctuations from a predetermined ratio in the average energy received at said receiving station and totalizing means to detect variation in the ratio of the total energy received from said transmitting stations, transmitting circuits at the controlling station arranged to cause propagation of controlling waves from said controlling station, circuit closing means for said transmitting circuits controlled by the instrument and totalizing means, and means at the transmitting station to receive the controlling waves and thereby operate the energy controlling means and cause effective maintenance of said predetermined energy ratio.

7. In a system of the class described, a plurality of transmitting stations arranged to propagate waves of radiant energy and provided each with means to regulate the energy propagated, a controlling station having means to receive said waves, means at the controlling station actuated by the differences in the energies received from the transmitting stations and arranged to effect propagation of controlling waves, means at the transmitting stations to receive the controlling waves and thereby operate the energy regulating means, a motile receiving station, and means at the receiving station to determine the ratio of the energies received from the transmitting stations.

8. In a system of the class described, a plurality of transmitting stations arranged to propagate waves of radiant energy and provided each with means to regulate the energy propagated, a controlling station having means to receive said waves and including an instrument to detect lack of balance in the energy received from respective transmitting stations, transmitting circuits at the controlling station arranged to cause propagation of controlling waves from said controlling station, circuit closing means for said circuits controlled by the instrument, means at the transmitting stations to receive the controlling waves and thereby operate the energy controlling means, a motile receiving station, and means at the receiving station to determine the ratio of the energies received from the transmitting stations.

9. In a system of the class described, a plurality of transmitting stations each arranged to propagate waves of radiant energy and provided each with means to regulate the energy propagated, a controlling station having means to receive said waves and including an instrument to detect fluctuations from a predetermined ratio in the average energies received at said receiving station and totalizing means to detect variation in the ratios of the total energies received from said transmitting stations, transmitting circuits at the controlling station arranged to cause propagation of controlling waves from said controlling station, circuit closing means for said transmitting circuits controlled by the instrument and totalizing means, means at the transmitting station to receive the controlling waves and thereby operate the energy controlling means and cause effective maintenance of said predetermined energy ratio, a motile receiving station, and means at the receiving station to determine the ratio of the energies received from the transmitting stations.

10. In a system of the class described, a plurality of transmitting stations arranged to propagate waves of radiant energy and provide each with means to regulate the energy propagated, a controlling station having means to receive said waves, means at the controlling station actuated by the differences in the energies received from the transmitting stations and arranged to effect propagation of controlling waves, means at the transmitting stations to receive the controlling waves and thereby operate the energy regulating means, a motile receiving station, means at the receiving station to determine the ratio of the energies received from the transmitting stations, and integrating means at said receiving station arranged to integrate the energy ratio determinations and thereby afford positional indications in similitude.

11. In a system of the class described, a plurality of transmitting stations arranged to propagate waves of radiant energy and provide each with means to regulate the energy propagated, a controlling station having means to receive said waves and including an instrument to detect lack of balance in the energy received from respective transmitting stations, transmitting circuits at the controlling station arranged to cause propagation of controlling waves from said controlling station, circuit closing means for said circuits controlled by the instrument, means at the transmitting stations to receive the controlling waves and thereby operate the energy controlling means, a motile receiving station, means at the receiving station to determine the ratio of the energies received from the transmitting stations, and integrating means at said receiving station arranged to integrate the energy ratio determinations and thereby afford positional indications in similitude.

12. In a system of the class described, a plurality of transmitting stations each arranged to propagate waves of radiant energy and provided each with means to regulate the energy propagated, a controlling station having means to receive said waves and including an instrument to detect fluctuations from a predetermined ratio in the average energies received at said receiving station and totalizing means to detect variation in the ratios of the total energies received from said transmitting stations, transmitting circuits at the controlling station arranged to cause propagations of controlling waves from said controlling station, circuit closing means for said transmitting circuits controlling by the instrument and totalizing means, means at the transmitting station to receive the controlling waves and thereby operate the energy controlling means and cause effective maintenance of said predetermined energy ratio, a motile receiving station, and integrating means at said receiving station arranged to integrate the ratio determinations and thereby afford positional indications in similitude.

13. The combinaton with a plurality of transmitting stations emitting waves of radiant energy, a motile receiving station, means at the receiving station to determine the ratio of the energies received from the transmitting stations, and integrating means at said receiving station arranged to integrate the radio determinations and thereby afford positional indications in similitude.

14. The combination with a transmitting station emitting waves of radiant energy, of a second station also emitting waves of radiant energy, the energies emitted by said stations being of effectively constant ratio, a motile receiving station, and means at the receiving station to determine the ratio of the energies received from the transmitting stations.

15. The combination with a transmitting station emitting waves of radiant energy, of a second station also emitting waves of radiant energy, the energies emitted by said stations being of effectively constant ratio, a motile receiving station, means at the receiving station to determine the ratio of the energies received from the transmitting stations, and integrating means at said receiving station arranged to integrate the ratio determinations and thereby afford positional indications in similitude.

16. In apparatus of the class described, a similitude board arranged to afford representation in plan of the zone of travel of a motile body, a second similitude board adjacent the first and arranged to indicate altitudes, indicators on each board representing the motile body, means to move each indicator in accordance with the movements of the body, and co-ordinating means connecting said indicators.

17. In apparatus of the class described, a similitude board arranged to afford representation in plan of the zone of travel of a motile body, a second similitude board adjacent the first and arranged to indicate altitudes, indicators on each board representing the motile body, means to move each indicator in accordance with the movements of the body, and co-ordinating means connecting said indicators and including an altitude scale carried by the indicator on the first board and an index carried by the other indicator and traveling over the scale.

18. In apparatus of the class described, a similitude board arranged to represent the field of movement of a motile body, an indicator movable over said board, radiant energy means for controlling the indicator and causing the same to move in similitude to the motions of the body, a speedometer geared to the scale of the similitude board and mounted adjacent the board, and a connection between the indicator and speedometer whereby rate of movement of the body is indicated by the speedometer.

19. In apparatus of the class described, a similitude board arranged to represent the field of movement of a motile body, an indicator movable over said board, radiant energy means for controlling the indicator and causing the same to move in similitude to the motions of the body, a pair of speedometers mounted at adjacent edges of the board, each geared to the scale of the board, a connection between each speedometer and the indicator whereby rates of movements of the body in two directions are indicated by the speedometers.

20. In apparatus of the class described, a similitude board arranged to indicate altitudes in the movement of a motile body, an indicator movable over said board and representing said body, radiant energy means for controlling the indicator and causing the same to move in similitude to the horizontal and vertical motions of the body, a profile strip representing the variations in altitude of the surface over which the body moves, and an altitude scale slidable vertically through the indicator and engaging the profile strip whereby to indicate the altitude of the body above the surface over which it moves.

21. In apparatus of the class described, a similitude board arranged to represent the field of movement of a motile body, an indicator movable over said board, radiant energy means for controlling the indicator and causing the same to move in similitude to the motions of the body, and radiant energy signalling means operatively connected to the indicator and arranged to transmit signals in accordance with the movements of the body as represented by the indicator.

22. In apparatus of the class described, a similitude board arranged to represent the field of movement of a motile body, an indicator movable over said board, radiant energy means for controlling the indicator and causing the same to move in similitude to the motions of the body, and movement limiting means for said body including circuits arranged to be closed by movements of the indicator beyond prescribed limits, and controlling devices for the body operated through the closing of respective circuits.

In testimony whereof I affix my signature.

WALTER W. CONNERS.